United States Patent
Song

(10) Patent No.: US 8,086,901 B2
(45) Date of Patent: Dec. 27, 2011

(54) TIMER CIRCUIT AND TIMER METHOD

(75) Inventor: Yong-Jun Song, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 13 days.

(21) Appl. No.: 12/829,404

(22) Filed: Jul. 2, 2010

(65) Prior Publication Data
US 2011/0099427 A1 Apr. 28, 2011

(30) Foreign Application Priority Data
Oct. 26, 2009 (CN) .......................... 2009 1 0308799

(51) Int. Cl.
*G06F 11/22* (2006.01)
(52) U.S. Cl. .............................. 714/36; 714/38.1; 713/2
(58) Field of Classification Search .................... 714/36, 714/38.1; 713/2
See application file for complete search history.

(56) References Cited

U.S. PATENT DOCUMENTS

| | | | |
|---|---|---|---|
| 2004/0153811 A1* | 8/2004 | Kuo ................................ 714/36 |
| 2004/0153812 A1* | 8/2004 | Miyayama et al. ............. 714/36 |
| 2004/0164990 A1* | 8/2004 | Chan et al. ..................... 345/581 |
| 2005/0102579 A1* | 5/2005 | Miyayama et al. ............. 714/38 |
| 2005/0257199 A1* | 11/2005 | Johansson et al. ............. 717/126 |
| 2006/0259826 A1* | 11/2006 | Swoboda et al. ............... 714/38 |
| 2007/0234122 A1* | 10/2007 | Lu .................................. 714/36 |
| 2008/0010516 A1* | 1/2008 | Lu .................................. 714/15 |
| 2008/0141073 A1* | 6/2008 | Shih et al. ...................... 714/36 |
| 2008/0163001 A1* | 7/2008 | Ko et al. ......................... 714/36 |
| 2008/0201572 A1* | 8/2008 | Shih ................................ 713/2 |
| 2009/0240934 A1* | 9/2009 | Chou ............................... 713/2 |
| 2010/0318707 A1* | 12/2010 | Tanaka et al. .................. 710/267 |
| 2011/0091039 A1* | 4/2011 | Spitz et al. ..................... 380/260 |

FOREIGN PATENT DOCUMENTS
TW    249099 B1 *  2/2006
* cited by examiner

*Primary Examiner* — Scott Baderman
*Assistant Examiner* — Chae Ko
(74) *Attorney, Agent, or Firm* — Altis Law Group, Inc.

(57) ABSTRACT

A timer circuit and a timer method are provided for a BIOS of an electronic device. The timer circuit includes a processing module, a setting module, and a display module. The processing module includes a microprocessor unit (MCU), a clock circuit 20, and a reset circuit. The timer circuit electronically connects with a debug card to measure a running time of a procedure of the BIOS of the electronic device. A timer result of the measurement is displayed on the display module.

6 Claims, 4 Drawing Sheets

TIMER CIRCUIT AND TIMER METHOD

BACKGROUND

1. Technical Field

The present disclosure relates to a timer circuit and a timer method.

2. Description of Related Art

Some features of a BIOS, such as BIOS Power-on self test (BIOS POST) and CPU initialization (CPU Init) have requirements related to running time. The BIOS transmits different values to Port 80 in different stages of a procedure. The values are often transmitted at an initial stage and a finish stage of the procedure. In the present technology, the running time between the initial stage and the finish stage is measured by a stopwatch. However, the precision of the stopwatch is inadequate.

DETAILED DESCRIPTION

In general, the words "module", and "unit" as used herein, refers to logic embodied in hardware or firmware, or to a collection of software instructions, written in a programming language, such as, for example, Java, C, or assembly. One or more software instructions in the unit may be integrated in firmware, such as an EPROM. It will be appreciated that module may comprise connected logic units, such as gates and flip-flops, and may comprise programmable units, such as programmable gate arrays or processors. The module and unit described herein may be implemented as either software and/or hardware unit and may be stored in any type of computer-readable medium or other computer storage device.

Figure 1:
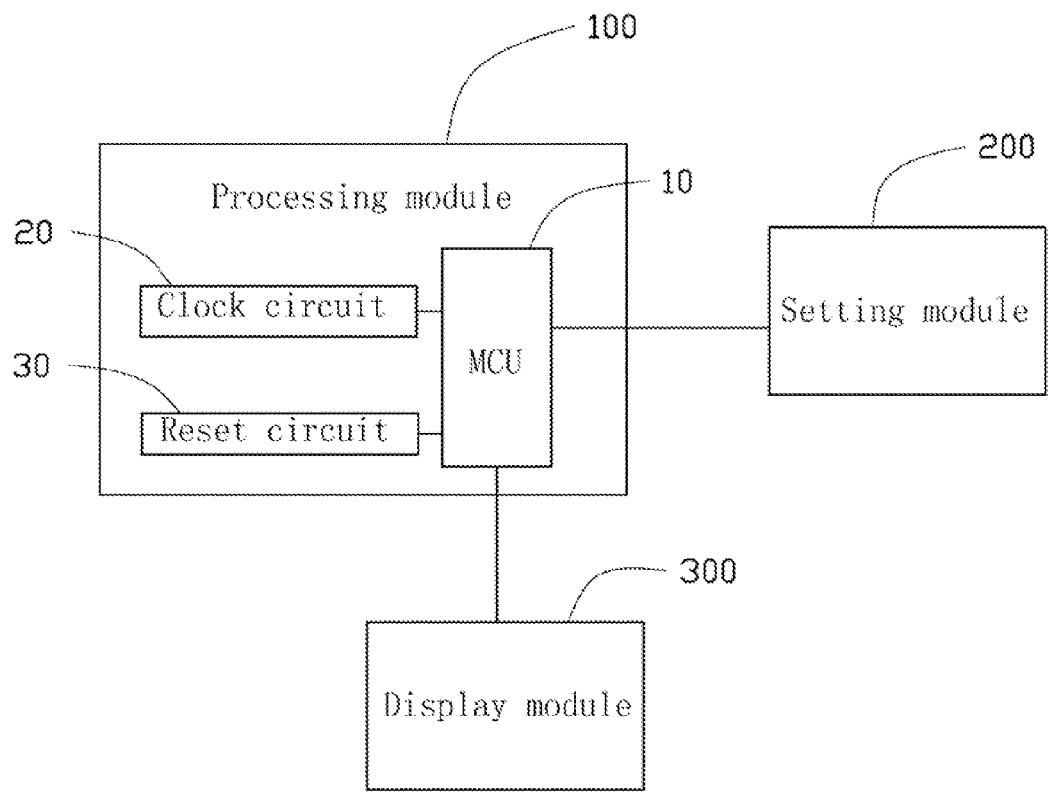
FIG. 1 is a block diagram of one embodiment of a timer circuit of the present disclosure.

FIG. 1 is a block diagram of one embodiment of a timer circuit of the present disclosure. The timer circuit includes a processing module 100, a setting module 200, and a display module 300. The processing module 100 includes a microprocessor unit (MCU) 10, a clock circuit 20, and a reset circuit 30. The timer circuit electronically connects with a debug card (not shown) to measure a running time of a procedure of a BIOS of an electronic device.

The setting module 200 is operable to set a first debug code and a second debug code corresponding to an initial stage and an final stage of the procedure respectively.

Figure 2:
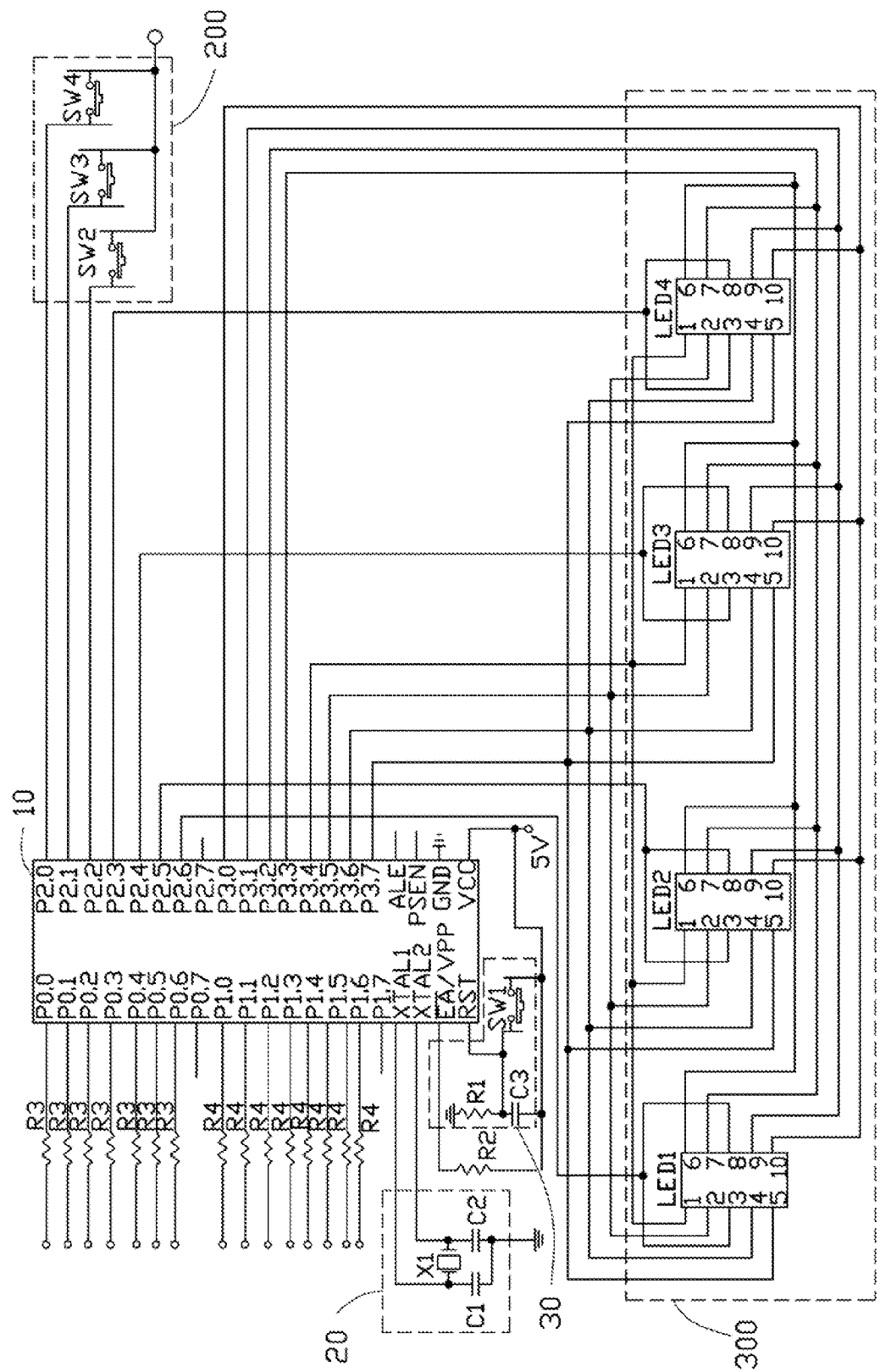
FIG. 2 is an exemplary embodiment of the timer circuit of FIG. 1.
Figure 3:
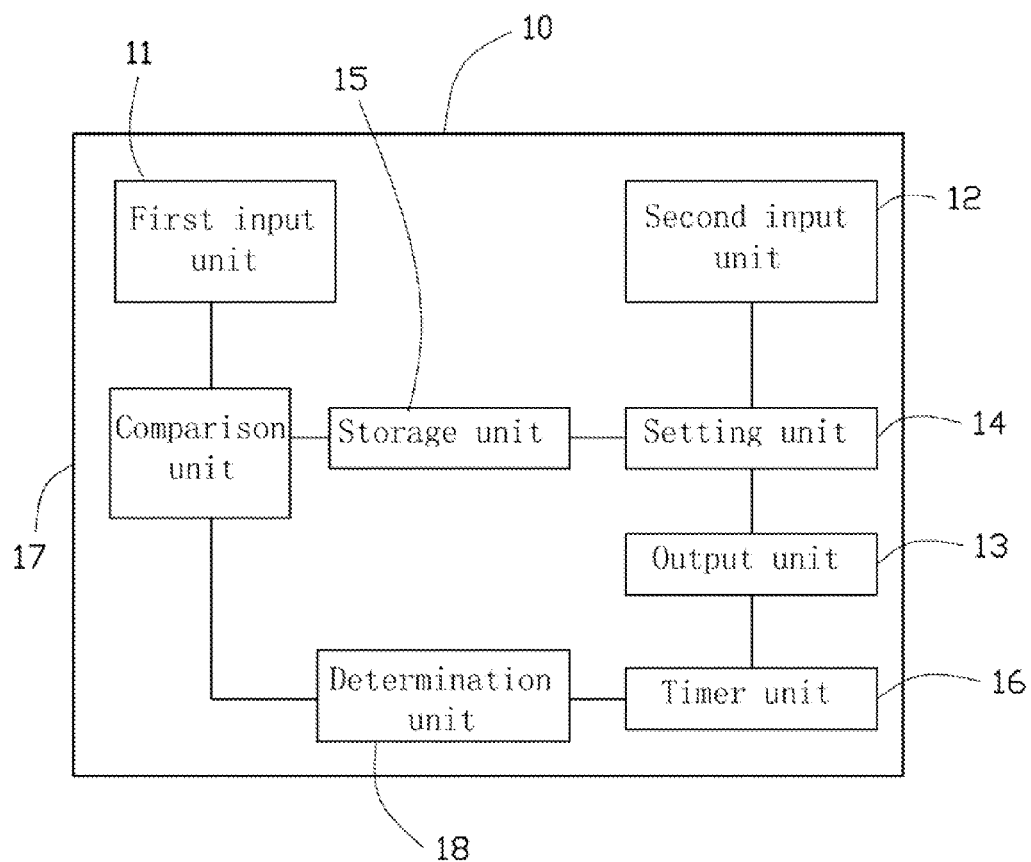
FIG. 3 is a block diagram of a MCU shown in FIG. 1.

The MCU 10 is operable to read a debug code of the debug card continuously and determine whether the debug code is the same as the first debug code, to start timing and determine whether the debug code is the same as the second debug code, and to finish timing and display a timing result on the display module. The debug code, the first debug code, and the second debug code are represented as two hexadecimal digits in the range 00 through FF FIG. 2 is an exemplary embodiment of the timer circuit of FIG. 1. In the embodiment, the MCU 10 is a microchip AT89C51. FIG. 3 is a block diagram of the MCU 10. The MCU 10 includes a first input unit 11, a second input unit 12, an output unit 13, a setting unit 14, a storage unit 15, a timer unit 16, a comparison unit 17, and a determination unit 18.

The first input unit 11 includes I/O pins P0.0-P0.6 and P1.0-P1.6 of the MCU 10. The second input unit 12 includes I/O pins P2.0-2.2 of the MCU 10. The output unit 13 includes I/O pins P2.3-2.6 and P3.0-3.7 of the MCU 10. The first input unit 11 continuously reads the debug code. The second input unit 12 reads the signals (described as follows) transmitted from the setting module 200.

The clock circuit 20 includes a crystal oscillator X1, and two capacitors C1, C2. An oscillator pin XTAL1 of the MCU 10 electronically connects with the crystal oscillator X1 and grounds through the capacitor C1. An oscillator pin XTAL2 of the MCU 10 electronically connects with the crystal oscillator X1 and grounds through the capacitor C2. The clock circuit 20 is operable to provide the MCU 10 with a clock pulse.

The reset circuit 30 includes a capacitor C3, a resistor R1, and a reset switch SW1. A first end of the reset switch SW1 electronically connects with a power 5V. A second end of the reset switch SW1 electronically connects with a reset pin RST of the MCU 10, the power 5V through the capacitor C3, and grounds through the resistor R1. The reset circuit 30 is operable to reset the MCU 10.

The setting module 200 includes a select switch SW2, a setting switch SW3, and a control switch SW4. In the embodiment, the select switch SW2, the setting switch SW3, and the control switch SW4 are types of buttons. The select switch SW2 electronically connects with the I/O pin P2.2 and the power 5V. The setting switch SW3 electronically connects with the I/O pin P2.1 and the power 5V. The control switch SW4 electronically connects with the I/O pin P2.0 and the power 5V. Switching the select switch SW2 and the setting switch SW3 on is operable to transmit a select signal and a setting signal to the MCU 10. The select signal and the setting signal are operable to set the first debug code and the second debug code. Switching the control switch SW4 on is operable to transmit a control signal to the MCU 10 for switching the timer unit 16.

The display module 300 includes a first light unit LED1, a second light unit LED2, a third light unit LED3, and a fourth light unit LED4. The pin P2.3 electronically connects with pins 3, 8 of the fourth light unit LED4. The pin P2.4 electronically connects with pins 3, 8 of the third light unit LED3. The pin P2.5 electronically connects with pins 3, 8 of the second light unit LED2. The pin P2.6 electronically connects with pins 3, 8 of the first light unit LED1. The pins P3.0-3.7 electronically connect with pins 10, 9, 7, 6, 1, 2, 4, 5 of the first light unit LED1, the second light unit LED2, the third light unit LED3, and the fourth light unit LED4.

A power pin VCC of the MCU 10 electronically connects with the power 5V. A ground pin GND of the MCU 10 grounds. An External Access pin $\overline{EA}$ VPP electronically connects with the power 5V through a resistor R2. Pins 0.7, 1.7, 2.7 of the MCU 10, a Program Store Enable pin $\overline{PSEN}$, an Address Latch Enable pin ALE/$\overline{PROG}$ of the MCU 10 are with no load.

The MCU 10 reads the debug code with the pins 0.0-0.6 electronically connecting with the debug card through resistors R3 and the pins 1.0-1.6 electronically connecting with the debug card through resistors R4.

The setting unit 14 selects a second digit of the first debug code to set when the select switch SW2 is switched on at the first time. The setting unit 14 adds one to the second digit of the first debug code through pressing the setting switch SW3 once, and outputs the second digit of the first debug code to the fourth light unit LED4 through the output unit 13. For example, if the first debug code is "1A", the second digit of the first debug code is "A".

The setting unit 14 selects a first digit of the first debug code to set when the select switch SW2 is switched on at the second time. The setting unit 14 adds one to the first digit of the first debug code through pressing the setting switch SW3 once, and outputs the first digit of the first debug code to the third light unit LED3 through the output unit 13. For example, if the first debug code is "1A", the first digit of the first debug code is "1".

The setting unit 14 selects a second digit of the second debug code to set when the select switch SW2 is switched on at the third time. The setting unit 14 adds one to the second digit of the second debug code through pressing the setting switch SW3 once, and outputs the second digit of the second debug code to the second light unit LED2 through the output unit 13. For example, if the second debug code is "2B", the second digit of the second debug code is "B".

The setting unit 14 selects a first digit of the second debug code to set when the select switch SW2 is switched on at the fourth time. The setting unit 14 adds one to the first digit of the second debug code through pressing the setting switch SW3 once, and outputs the first digit of the second debug code to the first light unit LED1 through the output unit 13. For example, if the second debug code is "2B", the first digit of the second debug code is "2".

The setting unit 14 stored the first debug code and the second debug code in the storage unit 15. The control signal is transmitted from the control switch SW4 to the second input unit 12 to switch the timer unit 16 on. The comparison unit 17 compares the debug code with the first debug code. The determination unit 18 determines whether the debug code is the same as the first debug code. The timer unit 16 starts timing if the debug code is the same as the first debug code. The comparison unit 17 compares the debug code with the second debug code. The determination unit 18 determines whether the debug code is the same as the second debug code. The timer unit 16 finishes timing if the debug code is the same as the second debug code.

The MCU 10 outputs the timer result got from calculating a time interval between starting timing and finishing timing to the first light unit LED1, the second light unit LED2, the third light unit LED3, and the fourth light unit LED4 through the output unit 13. A timer precision of the timer circuit can be 0.01 seconds, for example. The first light unit indicates a unit of the timer result. The second light unit indicates a decimal point of the timer result. The third light unit indicates a first digit behind the decimal point of the timer result. The fourth light unit indicates a second digit behind the decimal point of the timer result.

Figure 4:
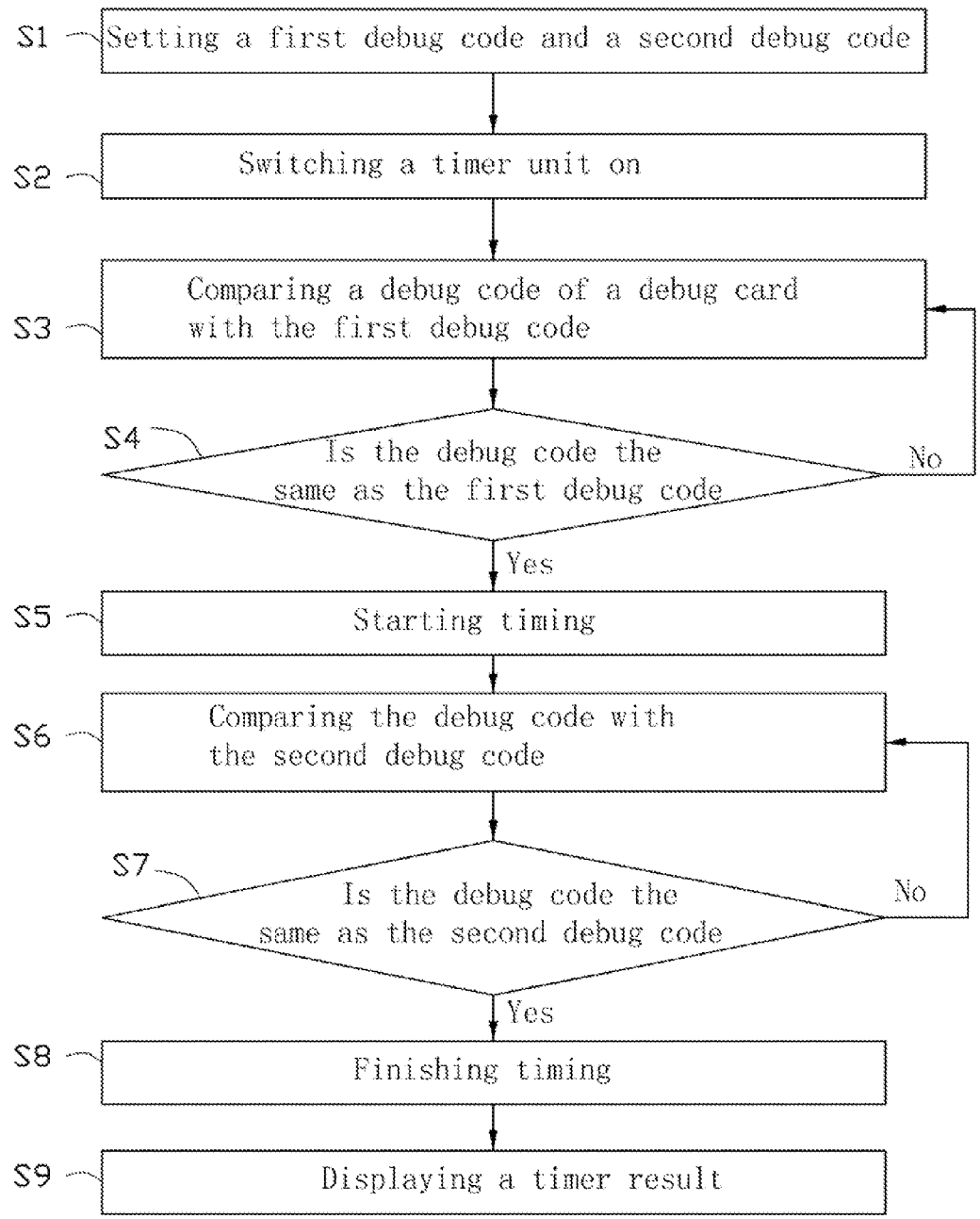
FIG. 4 is a flowchart illustrating one embodiment of a timer method of the present disclosure.

FIG. 4 is a flowchart illustrating a timer method of the present disclosure. Depending on the embodiment, additional blocks in the flow of FIG. 4 may be added, others removed, and the ordering of the blocks may be changed.

In block S1, the setting module 200 sets the first debug code and the second debug code.

In block S2, switching the timer unit 16 on by pressing the control switch SW4.

In block S3, the comparison unit 17 compares the debug code with the first debug code.

In block S4, the determination unit 18 determines whether the debug code is the same as the first debug code. If the debug code is different from the first debug code, the process goes back to block S3.

In block S5, if the debug code is the same as the first debug code, the timer unit 16 starts timing.

In block S6, the comparison unit 17 compares the debug code with the second debug code.

In block S7, the determination unit 18 determines whether the debug code is the same as the second debug code. If the debug code is different from the second debug code, the process goes back to block S6.

In block S8, if the debug code is the same as the second debug code, the timer unit 16 finishes timing.

In block S9, the display module 300 displays the timer result.

A timer circuit and a timer method of the present disclosure provide a precise measurement of running time of BIOS.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A timer circuit electronically connecting with a debug card to measure a running time of a procedure of a basic input/output system of an electronic device, comprising:
   a processing module comprising a microprocessor unit (MCU);
   a setting module operable to set a first debug code and a second debug code corresponding to an initial stage and a final stage of the procedure respectively;
   a display module;
   wherein the MCU is operable to read a debug code of the debug card continuously and determine whether the debug code is the same as the first debug code;
   wherein the MCU is operable to start timing and determine whether the debug code is the same as the second debug code;
   wherein the MCU is operable to finish timing and display a timing result on the display module; and
   wherein the MCU comprising a first input unit operable to read the debug code, and a second input unit operable to read a signal sent from the setting module.

2. The timer circuit of claim 1, wherein the MCU further comprises:
   a setting unit operable to store the first debug code and the second debug code in a storage unit;
   a timer unit;
   a comparison unit operable to compare the debug code with the first debug code and the second debug code;
   a determination unit operable to determine whether the debug code is the same as the first debug code and the second debug code; and
   an output unit operable to electronically connect with the display module and output the timer result to the display module.

3. The timer circuit of claim 2, wherein the setting module comprises:
   a select switch operable to transmit a select signal to select the first debug code and the second debug code;
   a setting switch operable to transmit a setting signal to set the first debug code and the second debug code; and
   a control switch operable to transmit a control signal to switch the timer unit.

4. The timer circuit of claim 3, wherein the setting switch is further operable to set a first digit and a second digit of the first debug code, and a first digit and a second digit of the second debug code.

5. The timer circuit of claim 4, wherein the first debug code and the second debug code are displayed on the display module.

6. The timer circuit of claim 5, wherein the display module comprises:
- a first light unit operable to indicate a unit of the timer result;
- a second light unit operable to indicate a decimal point of the timer result;
- a third light unit operable to indicate a first digit behind the decimal point of the timer result; and
- a fourth light unit operable to indicate a second digit behind the decimal point of the timer result.

* * * * *